US012102191B2

(12) United States Patent
Barnhart

(10) Patent No.: US 12,102,191 B2
(45) Date of Patent: Oct. 1, 2024

(54) BELT AUDIO SYSTEM

(71) Applicant: Eric Barnhart, Bradenton, FL (US)

(72) Inventor: Eric Barnhart, Bradenton, FL (US)

( * ) Notice: Subject to any disclaimer, the term of this patent is extended or adjusted under 35 U.S.C. 154(b) by 40 days.

(21) Appl. No.: 17/974,704

(22) Filed: Oct. 27, 2022

(65) Prior Publication Data

US 2023/0134450 A1 May 4, 2023

Related U.S. Application Data

(60) Provisional application No. 63/273,848, filed on Oct. 29, 2021.

(51) Int. Cl.
*A44B 11/00* (2006.01)
*H04R 1/02* (2006.01)

(52) U.S. Cl.
CPC ............ *A44B 11/005* (2013.01); *H04R 1/028* (2013.01)

(58) Field of Classification Search
CPC ............. Y10T 24/4063; Y10T 24/4058; Y10T 24/4098; H04R 1/028; A44B 11/005
See application file for complete search history.

(56) References Cited

U.S. PATENT DOCUMENTS 4,450,495 A * 5/1984 Naruki ................ G11B 25/063 381/387
4,871,998 A * 10/1989 Chaillou ............ A63B 23/0244 600/595
6,597,281 B1 * 7/2003 Thomas ............... G08B 3/1058 24/163 R
7,848,093 B2 * 12/2010 Hardson ................ G06F 1/163 361/679.55
8,056,780 B1 * 11/2011 Bruns .................. A44B 11/005 224/163
9,101,183 B2 * 8/2015 Szellos .................. F16M 13/00
9,697,720 B1 * 7/2017 Lassiter ................... H04N 5/77
2002/0196959 A1 * 12/2002 Gurner .................. H04R 5/023 381/301
2005/0107144 A1 * 5/2005 Dvorak .................. H04B 1/385 455/90.3
2007/0149264 A1 * 6/2007 Hong ..................... H04B 1/385 455/575.6
2009/0234201 A1 * 9/2009 Huang ................ A61B 5/1135 600/301

(Continued)

*Primary Examiner* — Robert Sandy
*Assistant Examiner* — Michael S Lee
(74) *Attorney, Agent, or Firm* — Jason T. Daniel, Esq.; Daniel Law Offices, P.A.

(57) ABSTRACT

A belt audio system includes a belt and a buckle assembly having a first buckle body and a second buckle body. The first buckle body includes hooks extending outward from the front surface, and the second buckle body including a pair of openings for receiving the hooks. An entertainment device having a magnet on the back surface is connected to the first and second buckle bodies. The entertainment device having a speaker, and a wireless transceiver for receiving content from an external device to be played on the speaker. A location identification unit provides distance information for a golf course, and a display provides the detected distance. A decorative buckle cover includes a magnet along a back surface and decorative elements along the front surface. The buckle cover magnetically connects to the buckle assembly when the entertainment device is not in use.

16 Claims, 11 Drawing Sheets

(56) References Cited

U.S. PATENT DOCUMENTS

| | | | | |
|---|---|---|---|---|
| 2010/0008514 | A1* | 1/2010 | Bates | A44B 11/005<br>24/163 K |
| 2016/0316837 | A1* | 11/2016 | Acton | A41F 9/00 |
| 2021/0312787 | A1* | 10/2021 | Brown | G08B 21/0288 |
| 2023/0301273 | A1* | 9/2023 | Alonci | A01K 15/021 |

* cited by examiner

BELT AUDIO SYSTEM

CROSS-REFERENCE TO RELATED APPLICATIONS

This application claims the benefit of U.S. Application Ser. No. 63/273,848 filed on Oct. 29, 2021, the contents of which are incorporated herein by reference.

TECHNICAL FIELD

The present invention relates generally to personal electronic devices, and more particularly to a wearable entertainment system that is integrated into a belt and buckle device.

BACKGROUND

The statements in this section merely provide background information related to the present disclosure and may not constitute prior art.

Users performing various outdoor sporting activities such as golf often enjoy listening to music or other audio content. As such, it is not uncommon for a golfer to use a portable speaker inside their golf cart to listen to music as they drive from hole to hole. Unfortunately, golf etiquette necessitates a quiet playing environment. As such, golfers must keep the volume from their speaker at a minimum setting such that it cannot be heard more than a few feet away.

Because golf and other such sports require the player to be able to use their hands at all times, it is simply not feasible to carry a portable speaker from the cart to the hole and back. As a result, golfers are unable to listen to their music when they are not inside (or immediately next to) the cart, which is the majority of the day.

Aside from these problems, many older golfers and/or residents living on golf courses have a tendency to complain when they spot a fellow golfer using a portable speaker system. For these reasons, some golfers use other known types of portable speakers, such as wireless headphones, for example. However, the use of these devices have several practical and safety drawbacks, because they impede the wearers ability to hear and/or interact with the other players.

Aside from music, many golfers also utilize a GPS based measuring system that provides approximate distances between the device and the hole on which the golfer is currently located. These systems typically comprise of a bulky electronic housing that remains clipped onto the golf cart throughout the round. As such, when the user is not standing next to the cart, they are unable to get the most accurate distance to the hole information.

Accordingly, it would be beneficial to provide an audio entertainment and distance measuring device that is incorporated into the design of an innocuous looking belt so as overcome the drawbacks described above. It would also be beneficial if the device could be customized to allow the belt and buckle portion to be used for different occasions when the entertainment and distance measuring device are not needed.

SUMMARY OF THE INVENTION

The present invention is directed to a belt audio system. One embodiment of the present invention can include a buckle assembly having a first buckle body and a second buckle body. The invention also includes a belt having a first end that is slidingly engaged to the first buckle body, and a second end that is fixedly engaged to the second buckle body. The first buckle body can include a pair of hooks extending outward from the front surface, and the second buckle body including a pair of openings for receiving the hooks.

One embodiment of the invention can also include an entertainment device having a speaker, and a wireless transceiver. The entertainment device can communicate wirelessly with an external device to receive content, and the entertainment device can be magnetically coupled to each of the first buckle body and the second buckle body of the buckle assembly.

In one embodiment, entertainment device can also include a location identification unit, an internal memory, and a display. The location identification unit can display distance information pertaining to a golf course stored within the memory and accessed by the display.

One embodiment of the invention can also include a buckle cover that is magnetically engaged to the buckle assembly. The buckle cover including decorative elements for use with the buckle and belt without the entertainment device.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
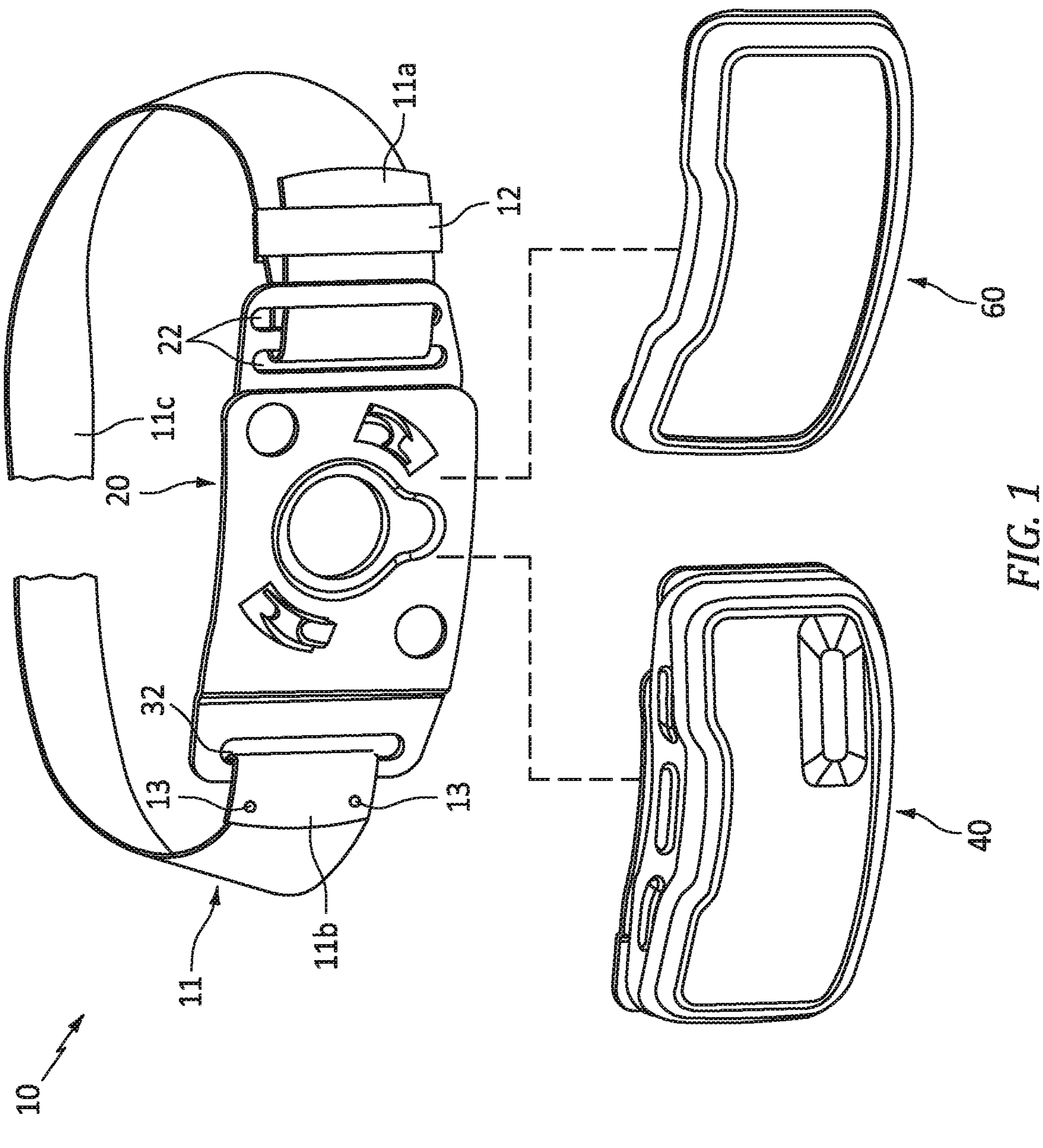
FIG. 1 is a perspective view of the components of a belt audio system that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described throughout this document, the term "decorative elements" can include any number and type of different colors, markings, words, shapes, symbols, logos, designs, types of materials, texturing of materials, patterns, images, lithographs, photographs and/or jewels, for example. These elements can be secured onto and/or into the identified portion of a component in accordance with known techniques so as to be flush with the surface thereof or can be recessed, raised and/or protruding outward therefrom, so as to give a three-dimensional effect.

As described herein, the term "connector" and "complementary connector" describe two components that work together to repeatedly join two separate items together in a nonpermanent manner. Several nonlimiting examples of connectors and complementary connectors include, but are not limited to, flexible strips of interlocking projections with a slider (i.e., zipper), thread-to-connect, twist-to-connect, and push-to-connect type devices, opposing strips of hook and loop material (e.g., Velcro®), attractively oriented magnetic elements or magnetic and metallic elements, buckles such as side release buckles, clamps, sockets, clips, carabiners, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

FIGS. 1-8C illustrate one embodiment of a belt buckle audio system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 illustrates one embodiment of the belt audio system 10 that includes a belt 11, a buckle assembly 20, a detachable entertainment device 40, and one or more buckle covers 60.

As described herein, the belt 11 can include an elongated flexible band having a first end 11*a*, a second end 11*b* and a central body section 11*c*. The belt is designed to be worn around the waist of a user in the expected manner and can therefore include any number of different shapes, sizes, and decorative elements. The belt can also be constructed from any number of suitable materials such as nylon, leather, plastic, or heavy cloth, for example.

Figure 2:
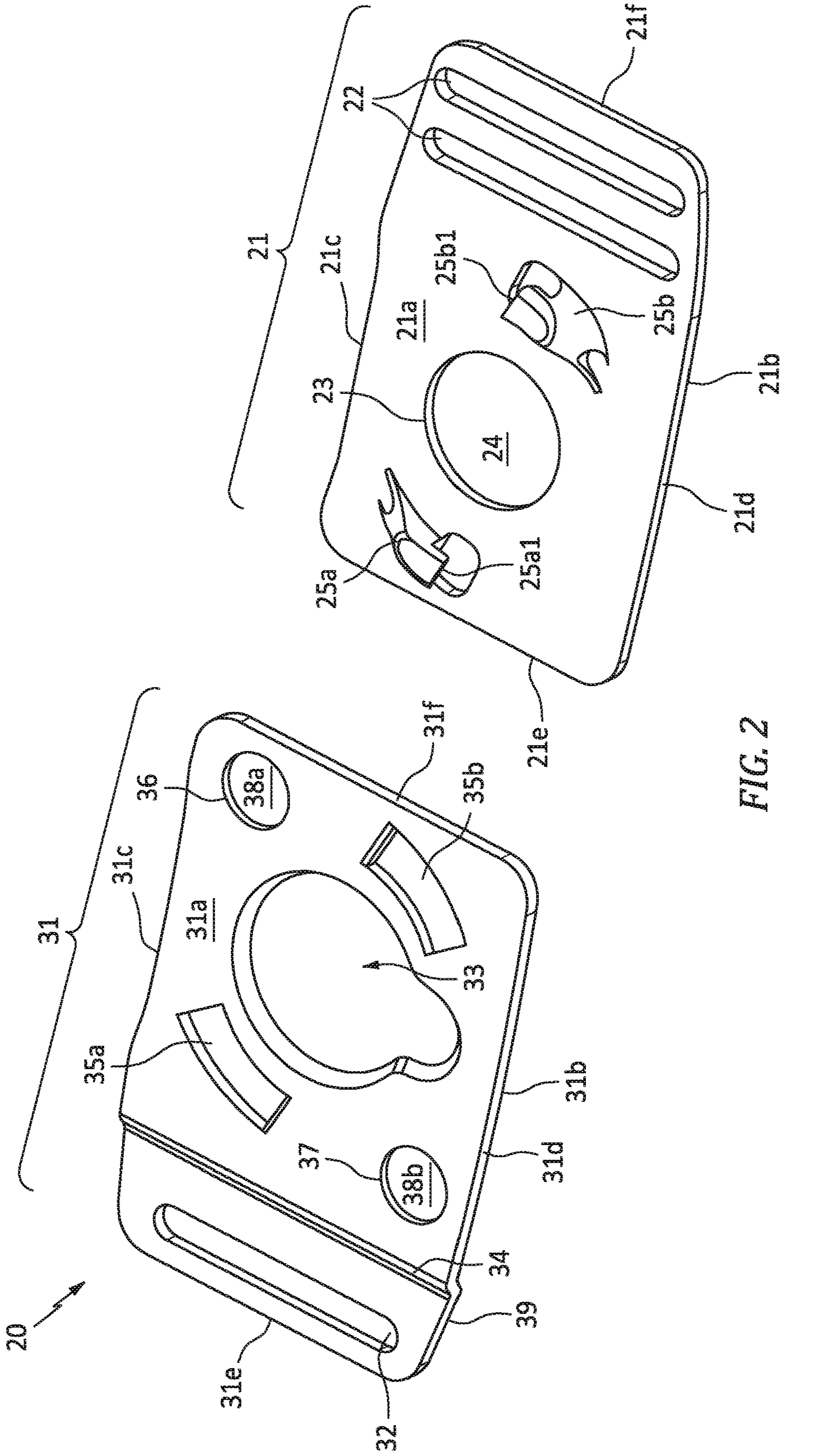
FIG. 2 is a perspective view of the buckle assembly in a disconnected orientation, in accordance with one embodiment of the invention.

FIG. 2 illustrates one embodiment of the buckle assembly 20 having a first buckle body 21 and a second buckle body 31 in a disconnected orientation. As shown, the first buckle body 21 can include a generally rectangular shaped member having a front surface 21*a*, a back surface 21*b*, a top wall 21*c*, a bottom wall 21*d*, and a pair of side walls 21*e* and 21*f*.

A pair of elongated belt slots 22 can be positioned along buckle body at a location adjacent to the side wall 21*f*, for receiving the first end of the belt 11*a*. As shown at FIG. 1, the pair of slots functioning to allow the first end of the belt to slide therethrough (e.g., slidingly receive) in varying increments, and can be held in place by a sliding loop 12 so as to permit the size of the belt to be reduced to fit the waist of the wearer.

In one embodiment, a central blind hole 23 can be formed along the front surface of the body, and a magnet 24 or other type of connector can be positioned within the hole. Additionally, a pair of raised hooks 25*a* and 25*b* can be positioned adjacent to the central recession. Each of the hooks including protruding edges 25*al* and 25*b*1 that are oriented in opposite directions to each other and can function to engage the slots of the second buckle body and lock onto the same when the buckle bodies are rotated in opposite directions.

The second buckle body 31 can also include a generally rectangular shaped member having a front surface 31*a*, a back surface 31*b*, a top wall 31*c*, a bottom wall 31*d*, and a pair of side walls 31*e* and 31*f*. A single elongated belt slot 32 can be positioned along buckle body at a location adjacent to the side wall 21*e*, for receiving the second end of the belt 11*b*. As shown at FIG. 1, the second end of the belt can be fixedly secured through the slot 32 by double cap rivets 13 or other such locking pins.

In one embodiment, a central opening 33 can be positioned through the center of the second buckle body 31, and a pair of slotted crescent-shaped openings 35*a* and 35*b* can be positioned angularly adjacent to the central opening. Each of the openings 35*a* and 35*b* including a shape and a size that is suitable for receiving the raised portions of the hooks 25*a* and 25*b*, respectively of the first buckle body 21.

In one embodiment, the second body section can include a pair of blind holes 36 and 37 that are formed along the front surface 31*a*. Additional magnets 38*a* and 38*b* or other type of connectors can be positioned within the holes and can function to receive and engage the below described entertainment device. In the preferred embodiment, the top surface of the second body section can include a lip 34 that is located between the belt slot 32 and the central opening 33. The lip defining a protruding area 39 that projects outward from the back surface.

As described herein, the buckle body sections can be constructed from materials that are strong and stiff for their weight such as various plastics or metals, for example. Of course, any number of other materials are also contemplated.

Figure 3A:
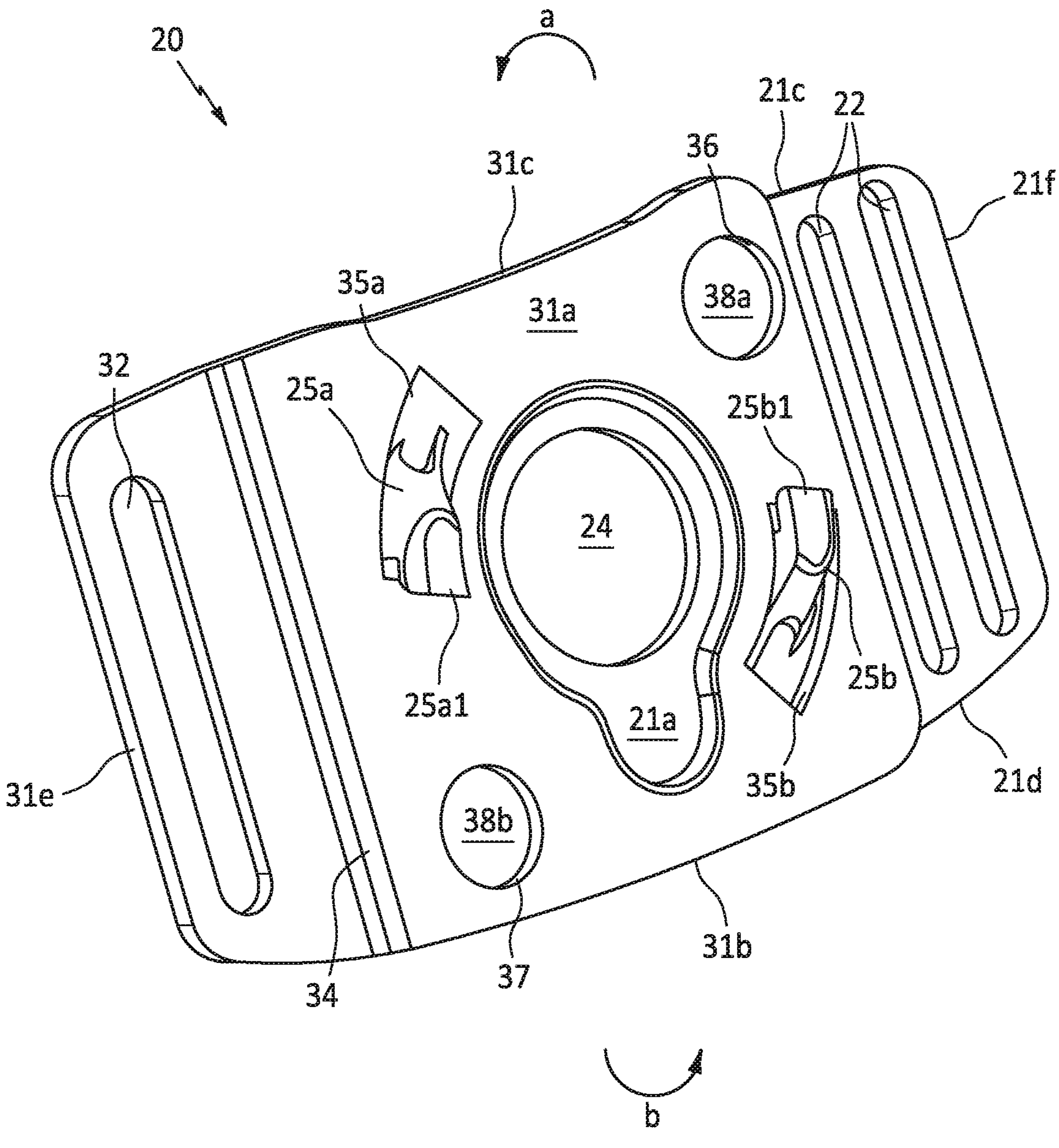
FIG. 3A is a perspective view of the buckle assembly in a connected orientation, in accordance with one embodiment of the invention.

As shown best at FIG. 3A, the buckle bodies 21 and 31 can be connected together by placing the second buckle body on top of the first buckle body and passing the hooks 25*a* and 25*b* through the openings 35*a* and 35*b*, respectively. When so positioned, a twisting motion of the buckle bodies in opposite directions e.g., body 21 twisting counterclockwise (arrow a), and/or body 31 twisting clockwise (arrow b) will position the protruding edges 25*al* and 25*b*1 onto the top surface of the second body 31*a* and will prevent inadvertent separation of the buckle sections.

Figure 3B:
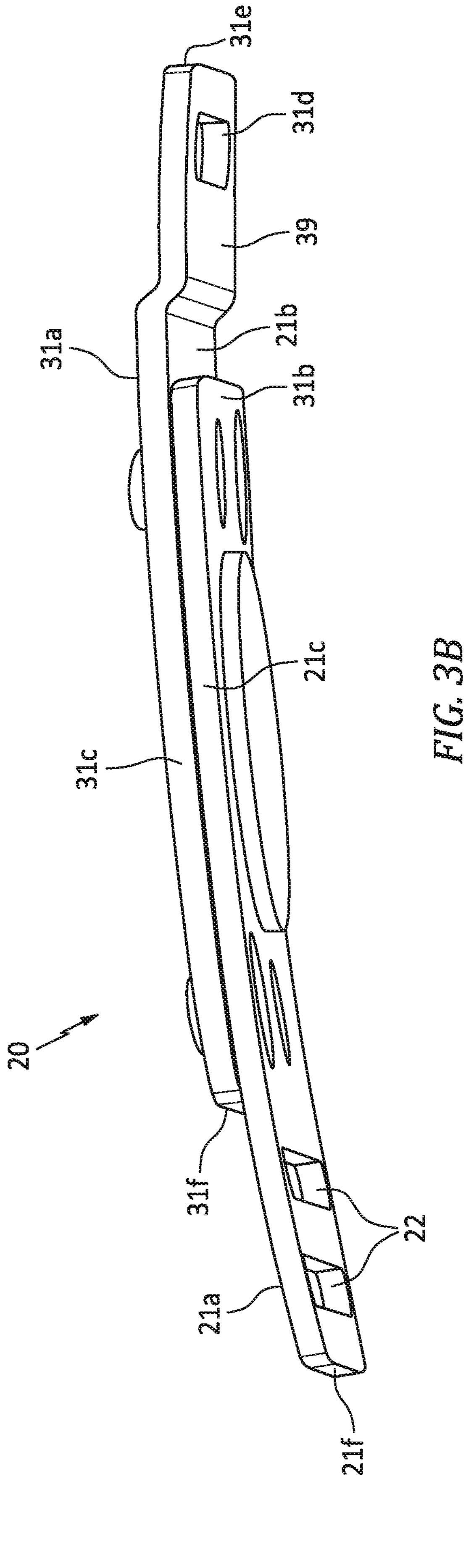
FIG. 3B is a top view of the buckle assembly in a connected orientation, in accordance with one embodiment of the invention.

As shown at FIG. 3B, the protruding area 39 of the second buckle body includes a thickness (e.g., distance outward from the back surface) that is complementary to the thickness of the first body section 21. As such, when the buckle bodies are secured together the bottom surface of the first plate 31*b* will be flush with the protruding section 39.

Although described above as utilizing a specific hook and slot system to connect the buckle bodies together, this is for illustrative purposes only. To this end, any number of other components forming other types of buckle systems that are capable of securing the buckle bodies together are also contemplated. Several nonlimiting examples include but are not limited to auto-lock buckle systems, magnetic buckle systems, double ring buckle systems, automatic locking splice buckle systems plate buckle systems and snap buckle systems, for example, wherein the respective functionally equivalent components are positionable along the buckle bodies.

Figure 4A:
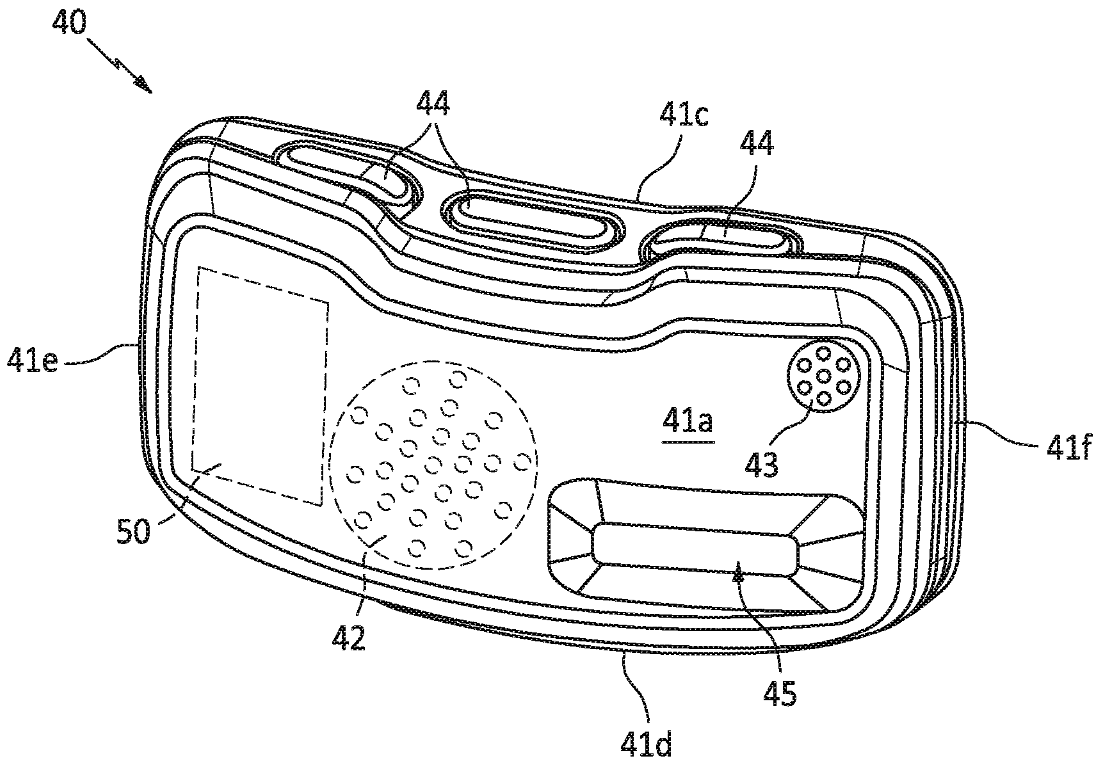
FIG. 4A is a front perspective view of the entertainment device, in accordance with one embodiment of the invention.
Figure 4B:
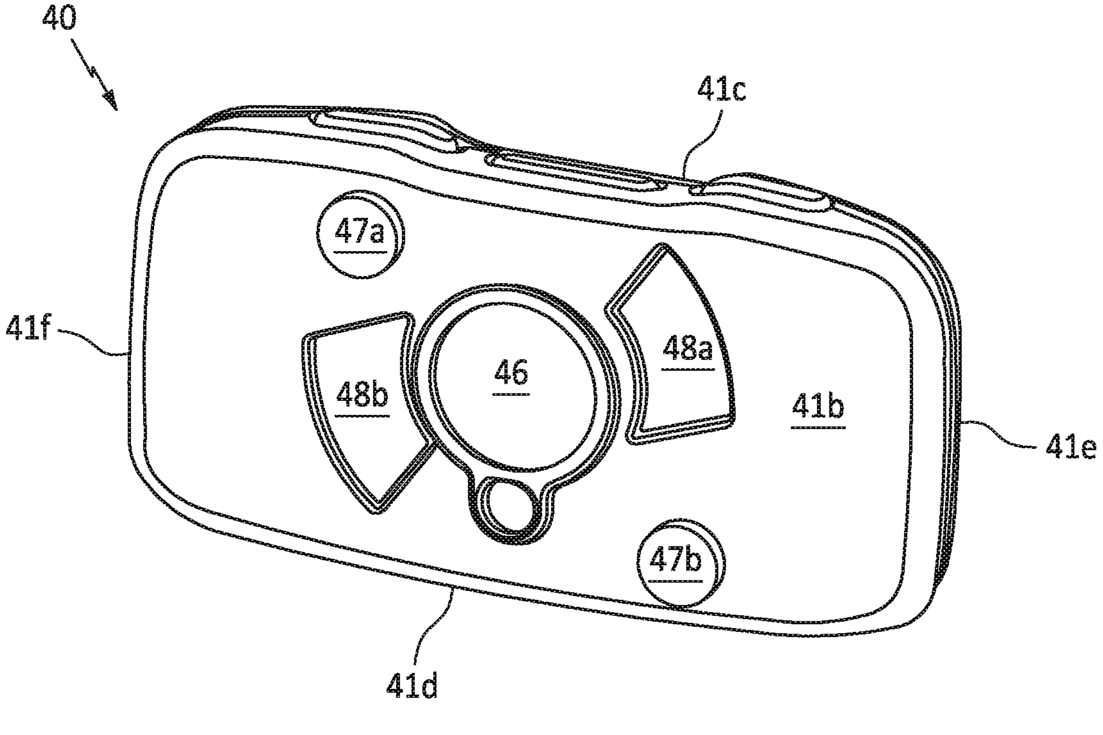
FIG. 4B is a back perspective view of the entertainment device, in accordance with one embodiment of the invention.

FIGS. 4A and 4B illustrate one embodiment of the detachable entertainment device 40. As shown, the device can include a generally rectangular-shaped main body member having a front surface 41*a*, a back surface 41*b*, a top wall 41*c*, a bottom wall 41*d* and a pair of side walls 41*e* and 41*f* that define an interior space. As described herein, the main body may be formed from any number of materials that are relatively strong and stiff for their weight and that can provide a watertight interior space for protecting the electrical components.

Several nonlimiting examples include but are not limited to various metals or metal alloys (e.g., aluminum, steel, titanium, or alloys thereof), plastic/polymers (e.g., high-density polyethylene (HDPE), rigid polyvinyl chloride (PVC), malleable polyethylene terephthalate (PET)), and/or various composite materials (e.g., carbon fibers in a polymer matrix, fiberglass, etc.). Moreover, although described as including a rectangular shape, this is for illustrative purposes only. To this end, the main body 41 can include any number of different shapes and can include any number of different colors and/or decorative elements.

As shown, a speaker 42 and microphone 43 can be positioned along or within the main body and can be connected to the internal controller 50. Although illustrated as a single speaker and microphone, any number of individual speakers and microphones can be provided at any number of locations along the main body. Moreover, each of the speakers can include sound specific elements such as bass speakers, tweeters and the like.

Any number of user input devices can be provided along the main body in order to allow a user to control the operation of the entertainment device. For example, one embodiment of the device can include a plurality of buttons 44 for providing one way communication with the system controller. One embodiment of the device can also include a Graphic User Interface (GUI) screen for providing two-way communication with a user. To this end, GUI screen 45 can preferably include a color touch screen monitor for providing a menu of actions that a user can select for instructing the system to perform any number of different operations.

In one embodiment, a large magnet 46 and a pair of smaller magnets 47*a* and 47*b*, can be positioned along the back surface 41*b* of the main body so as to extend outward therefrom. Each of the magnets can include a shape, size and location that is complementary to the shape, size and location of the magnets 24, 38*a* and 38*b*, respectively along the first and second buckle members described above. Likewise, a pair of indentations 48*a* and 48*b* can be positioned along the back surface. Each of the indentations can include a shape and location that is complementary to the shape and location of the crescent-shaped openings 35*a* and 35*b*, respectively.

Figure 5:
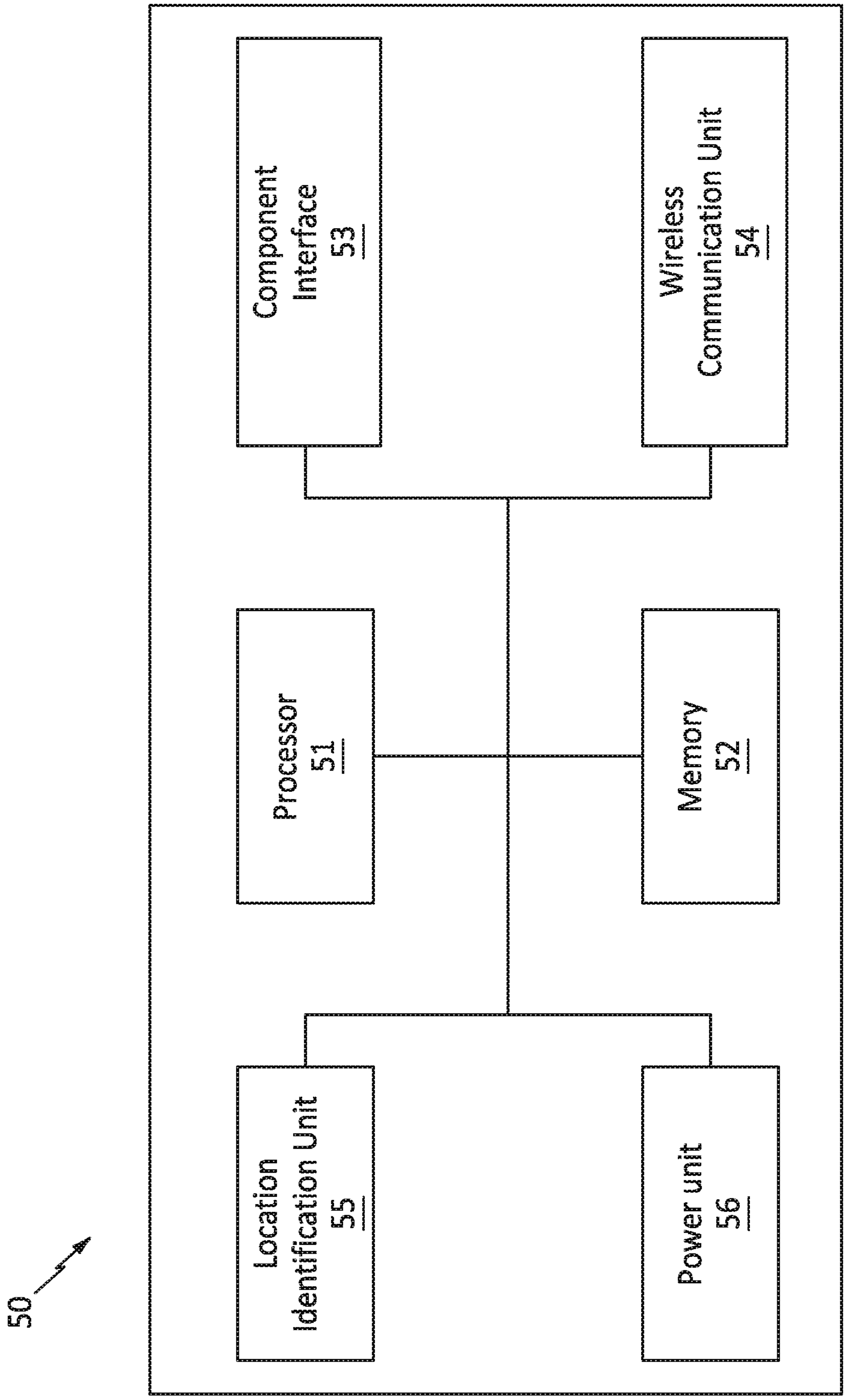
FIG. 5 a simplified block diagram of the system controller of the device, in accordance with one embodiment of the invention.

FIG. 5 is a simplistic block diagram illustrating one embodiment of the system controller 50. In one embodiment, the controller 50 can include a processing unit 51 that is conventionally connected to an internal memory 52, a component interface unit 53, a wireless communication unit 54, a location identification unit 55, and/or a power unit 56.

Although illustrated as separate elements, those of skill in the art will recognize that one or more system components 51-56 may include, comprise, or consist of one or more printed circuit boards (PCB) containing any number of integrated circuit or circuits for completing the activities described herein.

The processing unit 51 can include one or more central processing units (CPU) or any other type of device, or multiple devices, capable of manipulating or processing information such as program code stored in the memory 52 in order to allow the device to perform the functionality described herein.

Memory 52 can act to store operating instructions in the form of program code for the processing unit 51 to execute. Although illustrated in FIG. 5 as a single component, memory 52 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive, for example.

In the preferred embodiment, the memory can function to store location information pertaining to golf courses so as to allow the below described location identification unit to determine the device location relative to the location of the pin on each hole of a golf course. This information can be displayed on the GUI 45 and/or provided audibly via the speaker 42.

The component interface unit 53 can function to provide a communicative link between the processing unit 51 and various system elements such as the speaker 42, microphone 43, buttons 44 and/or GUI 45, for example. In this regard, the component interface unit can include any number of different components such as one or more PIC microcontrollers, standard bus, internal bus, connection cables, and/or associated hardware capable of linking the various components.

In one embodiment, the component interface unit can include, or can be connected to one or more cable plugs such as a USB port for example which can function to recharge the onboard battery and/or communicate with a secondary device such as a computer so as to send or receive information therewith. Of course, any other means for providing one or two-way communication between the system components can also be utilized herein.

The wireless communication unit 54 can include any number of components capable of sending and/or receiving electronic signals with another device, either directly or over a network. In one preferred embodiment, the communication unit 54 can include a Bluetooth communicator/transceiver for communicating wirelessly with a smartphone or other user device. Such a feature allowing a user to select any type of content such as a music playlist, for example, from their phone or other such device to be played via the speaker 42 on the device 40. Likewise, the onboard buttons and microphone can allow a user to answer or make telephone calls over the Bluetooth connection.

Of course, the device is not limited to the use of a Bluetooth transceiver, as other embodiments are contemplated wherein the communication unit 54 includes a different type of transceiver such as Wi-Fi, or cellular, among others, for example. In either instance, it is preferred that the communication unit include functionality for communicating with external devices located at least 100 to 200 feet away, as this is the typical distance a golf cart (in which the users phone may be located) is parked from a golf course hole during play.

The location identification unit 55 can function to provide real time location information (e.g., address, GPS coordinates, etc.) of the device 40 relative to the pin of a golf course hole on which the user is playing. To this end, the user can use the display to select a golf course which may be pre-loaded into the memory and can then use the location identification unit throughout round play to identify their distance to the hole. As noted above, these distances can be spoken audibly via the speaker 42 and/or displayed on the screen 45. In some instances, the screen can display information pertaining to the hole itself such as the Par number and a picture of the hole layout.

In one embodiment, the location module can comprise a discrete GPS transceiver for communicating with a third-party location tracking company that provides golf course hole and location tracking services for registered GPS enabled devices. Alternatively, or in addition thereto, the location unit can use or consist of a cellular transceiver for utilizing cellular location services offered by many different cellular service providers.

The power unit 56 can function to supply the required power to each of the system components. In one embodiment, the power unit can comprise an onboard battery which can be replaced via a compartment in the main body or can comprise a rechargeable battery that can be permanently located within the main body and recharged via the USB port of the component interface, for example.

Figure 6A:
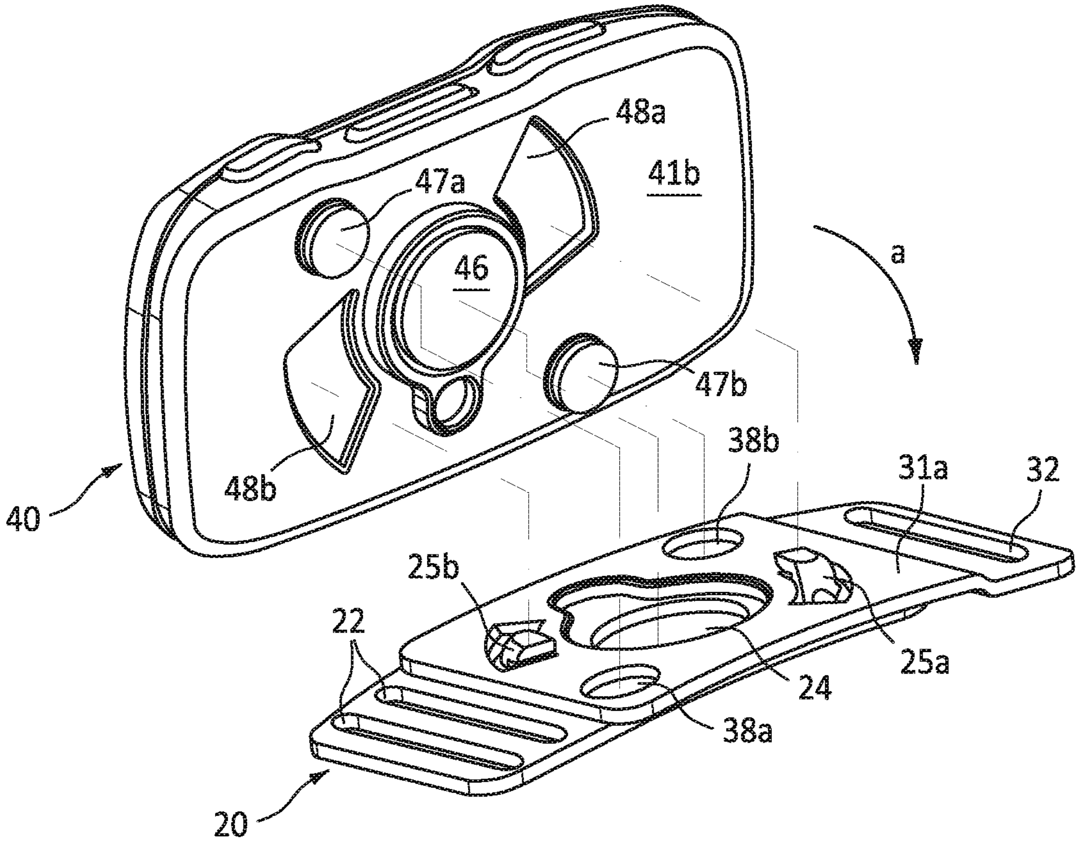
FIG. 6A is front perspective view of the entertainment device connecting to the buckle assembly, in accordance with one embodiment of the invention.
Figure 6B:
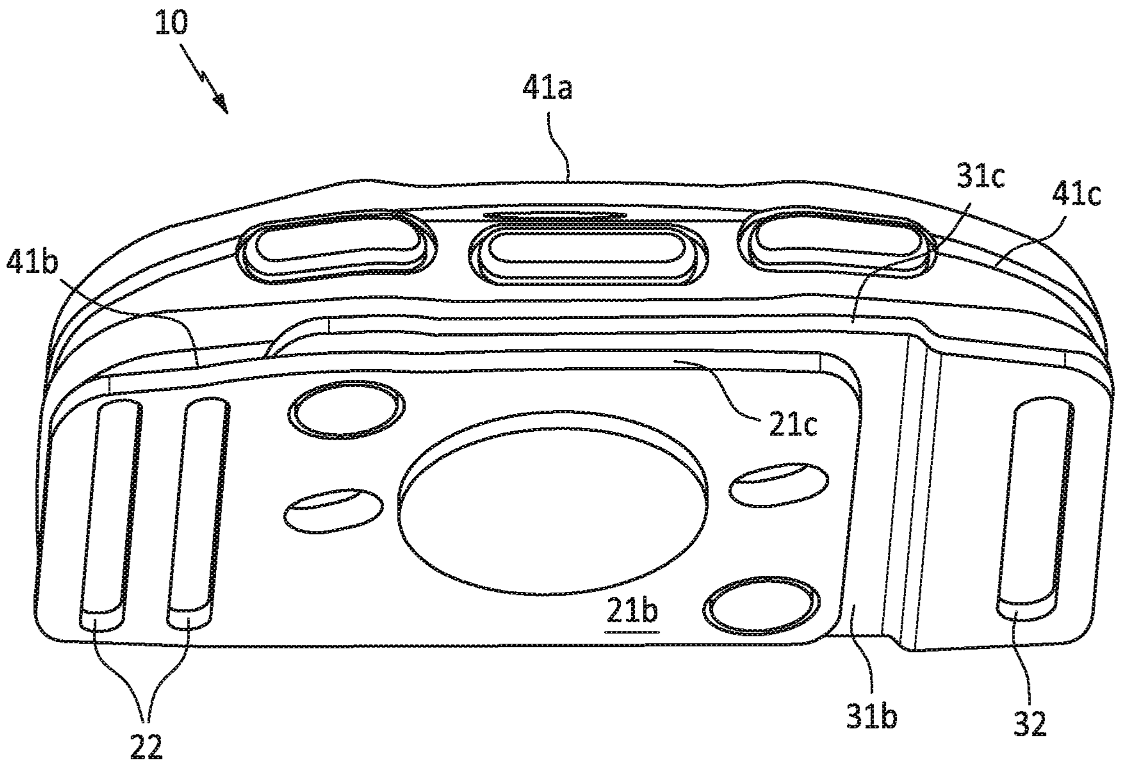
FIG. 6B is a rear perspective view of the entertainment device connected to the buckle assembly, in accordance with one embodiment of the invention.

As shown at FIGS. 6A and 6B, the entertainment device 40 can be removably connected to the buckle assembly by aligning the magnets 46 and 24, 47*a* and 38*a*, and 47*b* and 38*b* together, respectively. When so positioned, the magnets will be attractively engaged so as to position the back surface 41*b* against the to 9 surface 31*a* of the buckle assembly. In this position, the protruding portions of the hooks 25*a* and 25*b* can be located within indentations 48*a* and 48*b*, respectively so as to allow surfaces 41*b* and 31*a* to be flush against each other.

Figure 7:
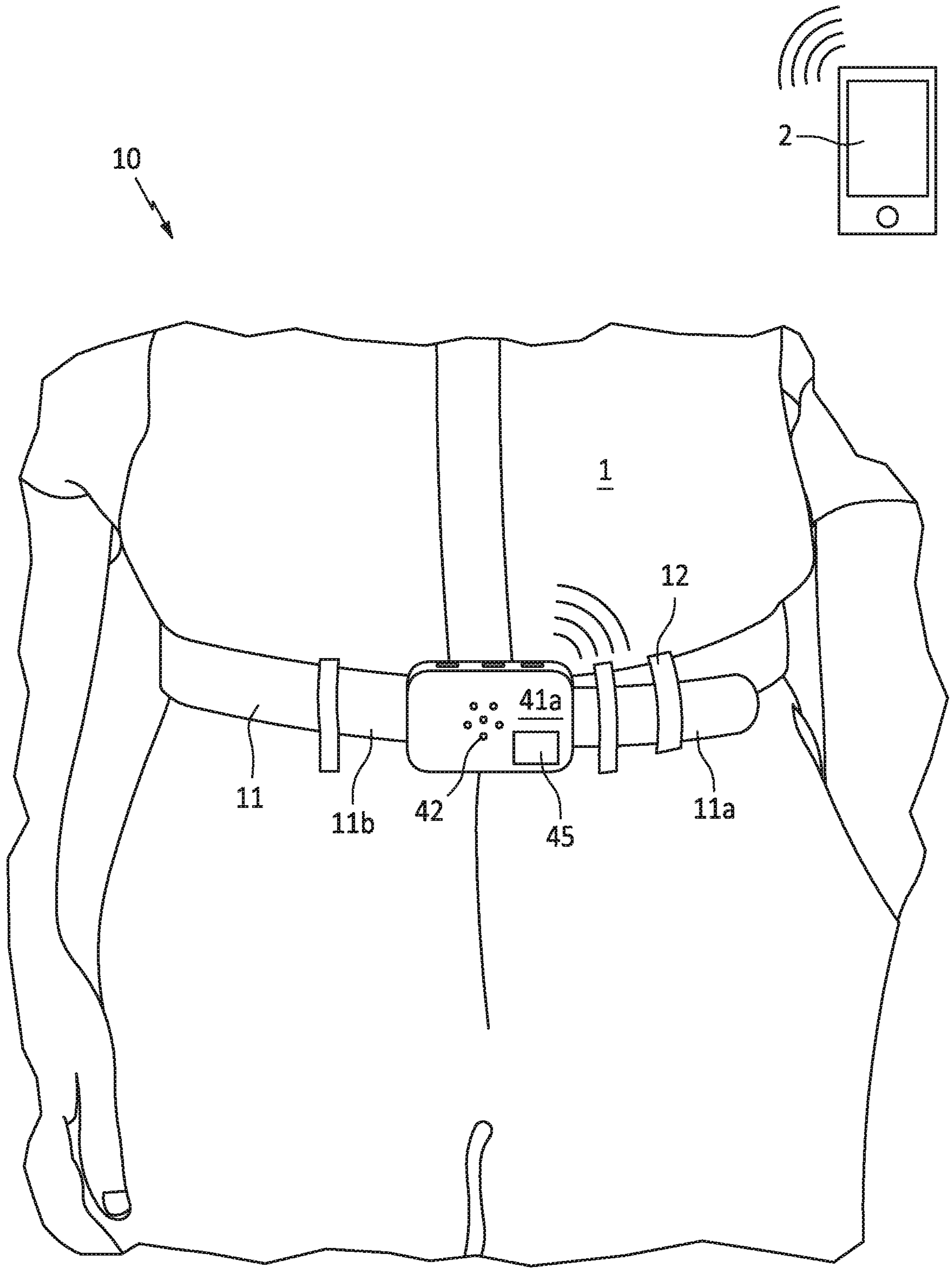
FIG. 7 is a front view of the audio belt system in operation with the entertainment device, in accordance with one embodiment of the invention.

FIG. 7 illustrates one embodiment of the device 10 in operation. As shown, when the belt 11 is positioned about the waist of a user 1, and the entertainment device 40 is secured to the buckle assembly, a user can send and receive information with an external device such as their smartphone 2, for example. In this regard, the speaker 42 can play music or other content and/or and the display 45 can provide distance to the hole information. Such functionality can be performed in a hands-free manner by the user, and without the user appearing to use an obvious looking portable speaker.

Figure 8A:
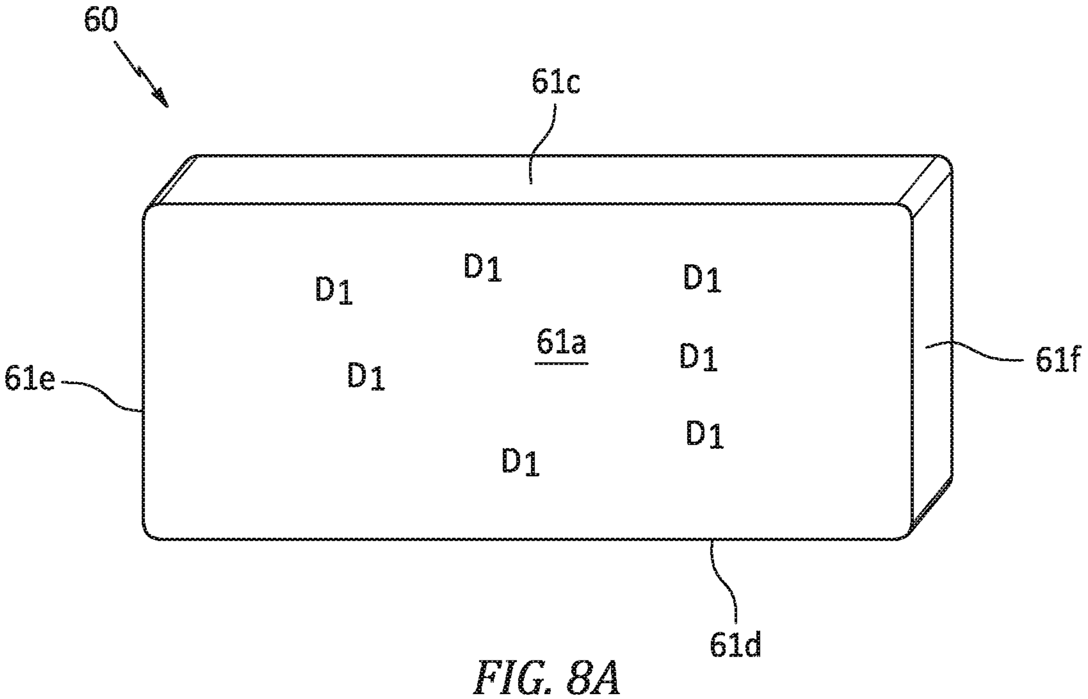
FIG. 8A is a front perspective view of the buckle cover, in accordance with one embodiment of the invention.
Figure 8B:
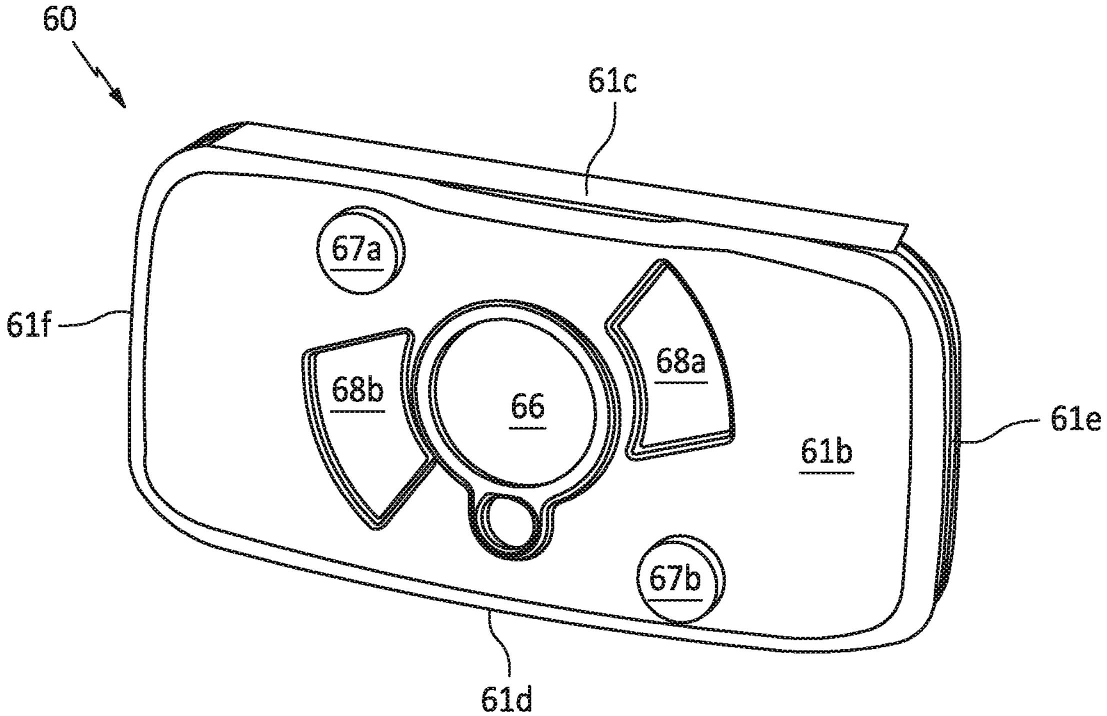
FIG. 8B is a back perspective view of the buckle cover, in accordance with one embodiment of the invention.
Figure 8C:
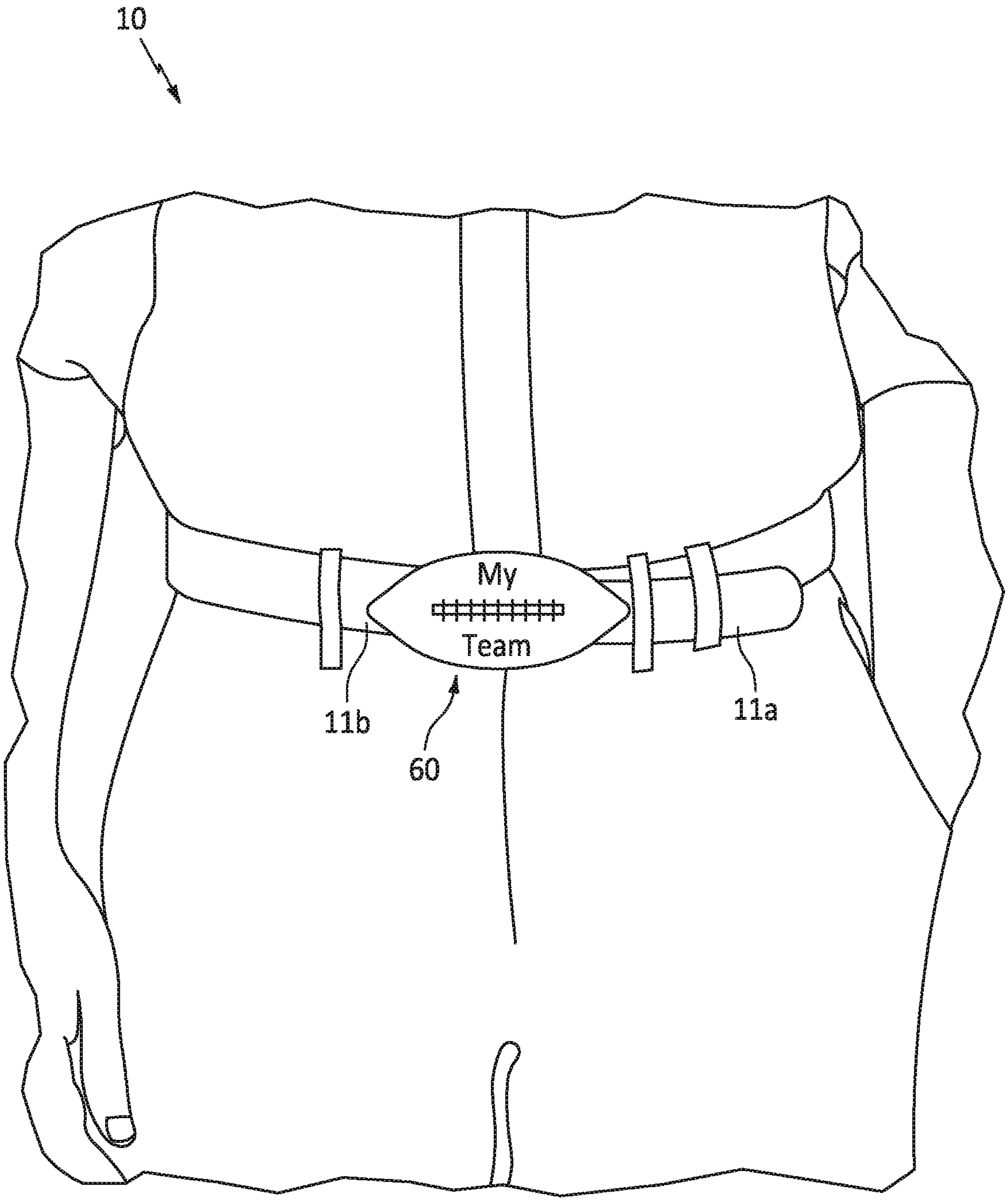
FIG. 8C is a front view of the audio belt system in operation with the decorative cover, in accordance with one embodiment of the invention.

FIGS. 8A-8C illustrate one embodiment of a buckle cover 60 which can be connected to the buckle assembly when not using the portable entertainment device 40, in order to allow a user to customize and wear the belt and buckle for any number of different occasions. To this end, the buckle cover 60 can include a main body member having a front surface 61*a*, a back surface 61*b*, a top wall 61*c*, a bottom wall 61*d* and a pair of side walls 61*e* and 61*f*.

The buckle cover can be constructed from the same materials as described above for the main body of the entertainment device 40 and can also include a large magnet 66 and a pair of smaller magnets 67*a* and 67*b* along the back surface 61*b*. Each of the magnets can include a shape, size and location that is complementary to the shape, size, and location of the magnets 24, 38*a* and 38*b*, respectively along the first and second buckle members described above. Likewise, a pair of indentations 68*a* and 68*b* can be positioned along the back surface. Each of the indentations can include a shape and location that is complementary to the shape and location of the crescent-shaped openings 35*a* and 35*b*, respectively.

In this regard, the buckle cover can be connected to the buckle assembly in the exact same manner as that described above with regard to FIGS. 6A and 6B. As described herein, the buckle cover can be constructed to include any number of different shapes and sizes and can include any number of different decorative elements D1, so as to allow a user to obtain and wear a different cover for any number of different occasions.

In various embodiments, the buckle cover 60 can include a fanciful shape, such as the football shown at FIG. 8C, for example, so as to allow a user to express their favorite sport team. Of course, this is but one example, as any number of different buckle covers can be provided, each having an unlimited number of different shapes, sizes and decorative elements.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:

a buckle assembly that includes a first buckle body having a front surface, a back surface, a top wall, a bottom wall a first side wall and a second side wall, and a second buckle body having a front surface, a back surface, a top wall, a bottom wall, a first side wall, and a second side wall;

a pair of hooks that extend outward from the front surface of the first buckle body;

a pair of openings that extend through the front surface and the back surface of the second buckle body;

a belt having a first end that is configured to engage the first side wall of the first buckle body, and a second end that is configured to engage the second side wall of the second buckle body; and an entertainment device that is removably secured to the buckle assembly, said entertainment device including a speaker and a user interface, wherein the buckle assembly is configured to transition between a connected position and an unconnected position, and in the connected position, the front surface of the first buckle body is positioned against the back surface of the second buckle body, and the pair of hooks are positioned through the pair of openings.

2. The system of claim 1, further comprising:

a pair of slots that are positioned along the first side wall of the first buckle body, said pair of slots being configured to slidingly receive the first end of the belt.

3. The system of claim 2, further comprising:

a single slot that is positioned along the second side wall of the second buckle body, said slot being configured to fixedly receive the second end of the belt.

4. The system of claim 1, wherein the entertainment device is magnetically connected to the buckle assembly.

5. The system of claim 1, wherein the entertainment device is configured to communicate wirelessly with an external device.

6. The system of claim 5, wherein the entertainment device is configured to play audible content received from the external device.

7. The system of claim 6, further comprising:

a buckle cover.

8. The system of claim 7, wherein the buckle cover is magnetically connected to the buckle assembly.

9. The system of claim 8, wherein the buckle cover includes a plurality of decorative elements.

10. The system of claim 1, further comprising:

a first magnet that is positioned along the front surface of the first buckle body.

11. The system of claim 10, further comprising:

a central opening that is positioned along the second buckle body.

12. The system of claim 11, further comprising:

a second magnet that is positioned along a back surface of the entertainment device.

13. The system of claim 12, wherein in the connected position, the first magnet and the second magnet are connected through the central opening.

14. The system of claim 1, further comprising:

a third magnet and a fourth magnet that are positioned along the front surface of the second buckle body.

15. The system of claim 14, further comprising:

a fifth magnet and a sixth magnet that are positioned along a back surface of the entertainment device.

16. The system of claim 15, wherein the entertainment device is removably connected to the first surface of the second buckle body via the third magnet, the fourth magnet, the fifth magnet, and the sixth magnet when the buckle assembly is in either of the connected position and the unconnected position.

* * * * *